United States Patent [19]

Clinch et al.

[11] Patent Number: 5,052,663
[45] Date of Patent: Oct. 1, 1991

[54] FIXATION ELEMENT AND METHOD FOR ITS PRODUCTION

[75] Inventors: Colin W. F. Clinch, Basing Stoke, England; Per-Arne Axelsson, Hällingsjö, Sweden

[73] Assignee: ITW Fixfast AB, Gothenburg, Sweden

[21] Appl. No.: 431,070

[22] Filed: Nov. 3, 1989

[30] Foreign Application Priority Data

Nov. 11, 1988 [SE] Sweden ............................ 8804079

[51] Int. Cl.⁵ ............................................. F16F 1/54
[52] U.S. Cl. .................................... 267/141; 267/136; 267/258; 267/293
[58] Field of Search ................ 267/292, 136, 140.1 R, 267/140.1 A, 141, 257, 219, 153, 258, 293; 248/562

[56] References Cited

U.S. PATENT DOCUMENTS

| | | | |
|---|---|---|---|
| 2,273,869 | 2/1942 | Julien | 267/141 |
| 4,430,776 | 2/1984 | Shimuzu et al. | 267/141 |
| 4,533,126 | 8/1985 | Mueller | 267/141 |
| 4,693,457 | 9/1987 | Kamata | 267/141 |

Primary Examiner—Matthew C. Graham
Attorney, Agent, or Firm—Schwartz & Weinrieb

[57] ABSTRACT

A fixation element and a method for producing such fixation elements for a vibration-insulating assembly of a first component 20 upon a second component 19 is disclosed. The fixation element comprises bearing plates 10, 11 which are positioned at a distance axially spaced from each other and which have projecting snap-in members 13, 18 which are intended to engage corresponding openings defined within each component 19, 20, so that the two components are made to bear in a stable manner against the bearing plates 10, 11. In this respect the snap-in members 13, 18 form an integral part of each bearing plate 10, 11. Moreover, the plates are mutually connected by means of a bridging part 12 of elastomeric plastic material. According to the method, the bearing plates are cast as a single piece 21 within a first casting mold, such that they are connected by at least one breakable bridge 22. The single piece 21 is placed within a second casting mold consisting of two halves 23, 24. The two mold halves are pushed together axially, with axial displacement of one bearing plate with respect to the other, so that the bridge is broken. Finally, an elastomeric plastic material 12 is cast into the mold between the two bearing plates 10, 11.

10 Claims, 3 Drawing Sheets

FIXATION ELEMENT AND METHOD FOR ITS PRODUCTION

FIELD OF THE INVENTION

The present invention relates to fixation elements forming a vibration-insulating assembly of a first component mounted upon a second component, in which respect the fixation element comprises bearing plates which are positioned at an axial distance from each other and which have projecting snap-in members which are intended to engage into a corresponding hole formed within each component, so that the two components are made to bear in a stable manner against the bearing plates.

BACKGROUND OF THE INVENTION

Vibration-insulating assemblies of a first component mounted upon a second component usually involves the use of rubber elements, and the assemblies are often assembled by means of screws, nuts, washers and sometimes even with a spacing sleeve extending through the assembly. The use of a plurality of work-pieces results in a multitude of problems. For example, the various work-pieces entail more work in terms of distribution and storage. Furthermore, the assembly is made difficult and time-consuming, particularly if the spaces defined around the two components are scant. In addition, the assembly must normally be effected by means of a precise tightening movement, so that the elastomeric element is not compressed more than is permitted.

These problems arise, for example, in connection with the assembly of a refrigerant compressor within a refrigerator or freezer. The vibrations from such a compressor generate vibrations which can be transmitted to the framework of the refrigerator or freezer and give rise to resonance noise. The vibrations can also damage refrigerant-carrying pipes and other components within the refrigerator or freezer. The proper assembly of the compressor within a refrigerator or freezer is therefore regarded as being of great importance with respect to the quality of the finished product. As a result of such high quality demands, in an actual case the assembly of the compressor can require between two and three minutes of assembly time. This means that the assembly of the compressor has posed a significant time problem in connection with the economic or rapid production of refrigerators and freezers.

Fixation elements fabricated of plastic material have been tested, wherein such elements have been cast in one piece and have been provided with a vibration damping design by means of parts with small material thickness. These fixation elements, however, are relatively poor at damping vibrations and have therefore not satisfied the quality requirements.

Conditions similar to those which have been described above also apply to other production lines, such as, for example the assembly of compressors within heat pumps and various components within vehicles.

OBJECTS OF THE INVENTION

An object of the invention is to provide a fixation element by means of which the disadvantages described above can be avoided. A further object of the invention is to produce such fixation elements in an efficient manner.

SUMMARY OF THE INVENTION

A fixation element according to the invention is characterized in that the snap-in members form an integral part of each bearing plate, and in that the plates are mutually connected by means of a bridging part fabricated from an elastomeric plastic material. By means of this fixation element it is possible to join the two components together in a vibration-insulating manner within a very short period of time.

According to an advantageous exemplary embodiment of the invention, the elastomeric part is molecularly bound to each bearing plate. Alternatively, the elastomeric part can be mechanically bound to each bearing plate by means of bridges of elastomeric material which extend through holes defined within each bearing plate. Both of these methods result in an effective binding defined between a rigid plastic material and a vibration-insulating elastomeric material.

At least one sleeve-shaped member expediently extends from the first bearing plate and through an opening, coaxial with the longitudinal axis of the member, into the second bearing plate, with a clearance defined between the opening of the second bearing plate edge and the sleeve-like member which is sufficient to prevent mutual contact therebetween under normal operating conditions. This arrangement provides transport reliability, in that such prevents the occurrence of damage to the components, even if the components were to be disposed in an abnormal position or orientation.

According to a further advantageous exemplary embodiment of the invention at least one of the snap-in members is provided with a locking pin which is cast coaxially with such member and which, after assembly upon each component, can be driven into a snap lock position for locking the assembly upon the components. By means of this arrangement it is possible for the one snap lock to be provided with relatively small dimensions, without becoming structurally weak.

A method for production of the fixation elements according to the invention is characterized in that the bearing plates are cast within one piece in a first casting mold, such that they are connected by at least one breakable bridge, in that the cast piece is positioned within a second casting mold consisting of two halves, in that the two mold halves are pushed together in the axial direction such that axial displacement of one bearing plate occurs with respect to the other, so that the bridge is broken, and, in that an elastomeric plastic material is cast into the mold between the two bearing plates. The advantage obtained by means of this production method is that only one work-piece needs to be moved from the first to the second casting mold.

The two mold halves of the second casting mold are expediently pushed together until a desired distance between the two bearing plates is obtained. In this respect the amount of the displacement of the two bearing plates can be varied by means of a plunger displaceable axially within the mold, so that fixation elements with different desired distances defined between the two bearing plates can be produced within one and the same molding tool, apparatus, equipment, or the like.

According to an advantageous embodiment of the method according to the invention, the second casting mold is divided in line with the first bearing plate. By means of this design of the second casting mold, the breaking apart of the two bearing plates can be automatically effected by bringing the two molding halves, dies, or the like, together.

Moreover, the second bearing plate can be provided with a central opening for receiving the sleeve-shaped member projecting from the first bearing plate. This makes it possible, by means of the one molding die, to reach in through the second bearing plate and to displace the first plate axially, so that the bridging parts are broken and the required distance is obtained between the two bearing plates.

BRIEF DESCRIPTION OF THE DRAWINGS

The abovementioned characteristics and further characteristics of the invention will be described in more detail below, with reference to the attached drawings in which like reference characters designated like or corresponding parts throughout the several views, and wherein.

DESCRIPTION OF A PREFERRED EMBODIMENT

Figure 1:
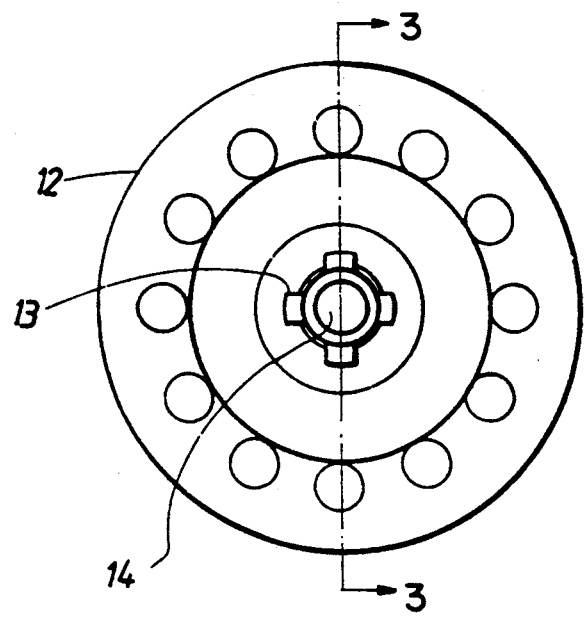
FIG. 1 is an end view of a fixation element according to a first embodiment of the invention.
Figure 2:
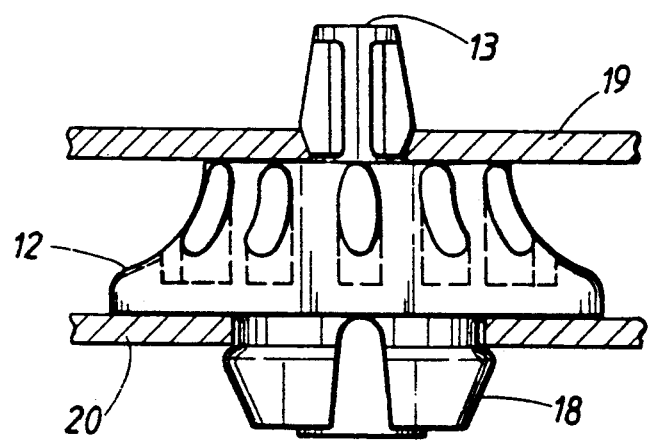
FIG. 2 is a side view of the fixation element shown in one assembly position between two components.
Figure 3:
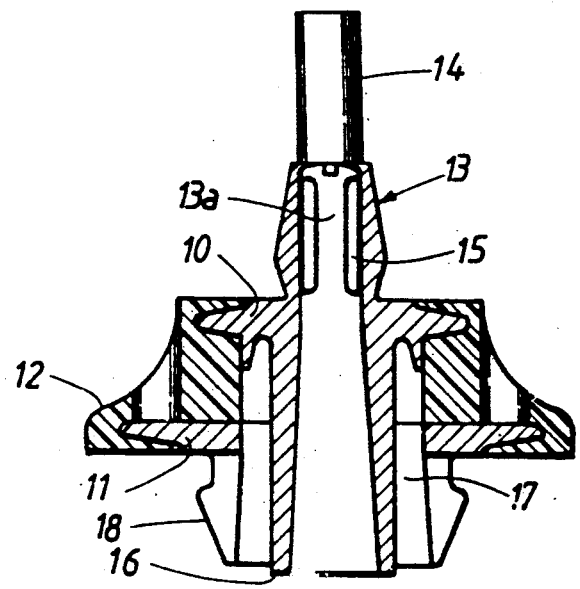
FIG. 3 is a section along the line 3—8 in FIG. 1.

The fixation element shown in FIGS. 1-3 comprises two circular bearing plates 10 and 11 which are disposed parallel to each other and of which the former has a smaller diameter than latter. The two plates lo, 11 are held together by means of a bridging part 12 of elastomeric material.

The bearing plate 10 is provided with a relatively narrow snap-in member 13 which projects perpendicular to that side of the bearing plate 10 remote from the plate 11. A cylindrical locking pin 14 is disposed within an extension of the snap-in member 13, so that it can be driven axially into a co-axial, inner channel 15 defined within the snap-in member 13. The bearing plate 10 is provided, on that side opposite to the snap-in member 13, with a sleeve section 16 which is co-axial with the longitudinal direction of the channel 15 and which extends through a central opening 17 defined within the wider bearing plate 11.

The opening 17 is substantially wider than the sleeve section 16 that contact between the opening edge of the plate 11 and the sleeve section is prevented under normal operating conditions.

The bearing plate is provided with a comparatively wider snap-in member 18 which projects perpendicular to that side of the plate 11 remote from the plate 10.

FIG. 2 shows the fixation element disposed an assembly position between a first component 19, such as for example a part of a refrigerator frame, and a second component 20, for such as, example a fixation plate of a refrigerant compressor. The locking pin 14 is disposed inside the snap-in member 13 and radially expands the resilient bridges 13a which form the snap-in member 13. At the same time the locking pin 14 strength is the most sensitive part of the snap-in member, that is, the neck section at the transition point with the bearing plate 10. FIG. 2 shows a conceivable use position for the fixation element with the refrigerator standing vertically. However, if the refrigerator is transported in a horizontal mode, there is a risk that the elastomeric part 12 of the fixation element will be subjected to abnormal stresses, such as, for example shear stresses The sleeve section 16 is therefore provided for preventing the occurrence of such stresses.

The fixation element described above is ready for assembly, in which respect the necessary number of fixation elements are pressed firmly such that their snap-in members 18 are inserted into assembly holes within the one component 20. Thereafter, the opposite snap-in members 13 are inserted into assembly holes within the second component 19. Finally, the locking pin 14 is driven into each snap-in member 13. This assembly normally takes place in approximately 10 to 15 seconds, if four fixation elements are used. The radiation in assembly time is therefore very significant in comparison with conventional assembly methods.

Figure 4:
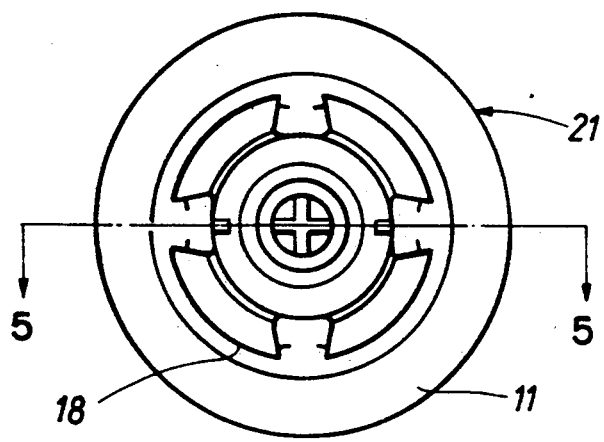
FIG. 4 is an end view showing the fixation element during manufacture, between a first and a second casting operation.
Figure 5:
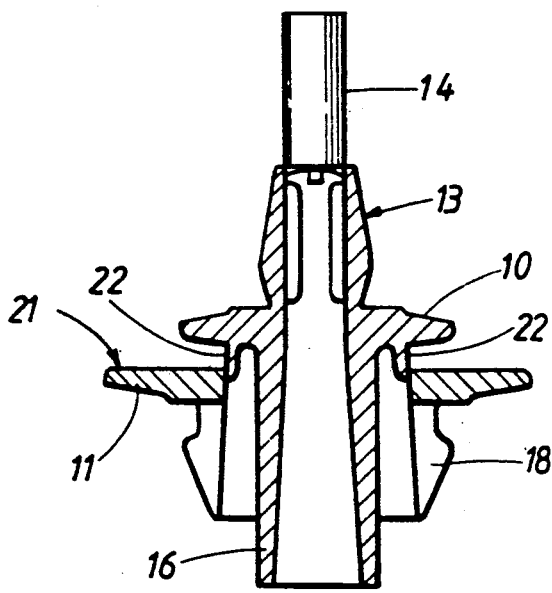
FIG. 5 is a section along the line 5—5 in FIG. 4.
Figure 6:
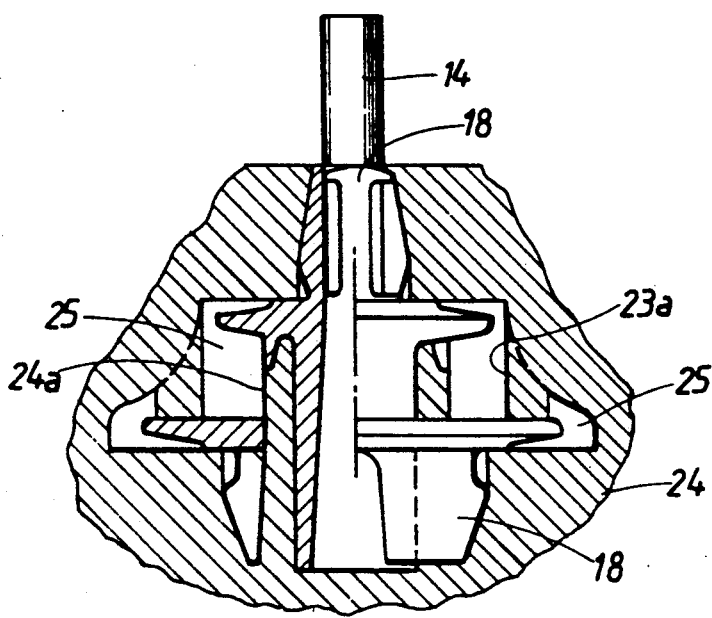
FIG. 6 shows, in a broken view, a casting mold for carrying out the second casting operation.

The production of the above-described fixation element is described schematically in connection with FIGS. 4-6. Here, the work-piece 21 shown-in FIGS. 4 and 5 is die-cast as a single piece of a rigid plastic material, such as, for example polyamide, in which respect the two bearing plates 10, 11 are connected by means of bridges 22 and the locking pin 14 is connected to the snap-in member 13 in the manner already described.

The work-piece 21 is placed within a second casting mold which consists of two halves 23, 24 and is divided in line with the outside of the bearing plate 11. When the two mold halves are brought together, the two bearing plates 10, 11 are displaced axially apart, until the bridges 22 are broken and a predetermined distance is achieved between the plates. The attachment of the two parts broken apart within the molding tool or die is effected, inter alia, by means of a of projecting pins 23a integral with the mold half 23 and a sleeve 24a half 24. The remaining space 25 defined within the molding tool or die is filled, for example, with a thermoplastic elastomer. After hardening of this elastomer, the fixation element can be taken out of the molding tool as a finished product.

The height of the fixation element can be varied by increasing or decreasing the distance between the two bearing plates. It is possible to design the mold halves 23, 24 with axially displaceable parts, which permit alteration of the appearance of the elastomer part.

Figure 7:
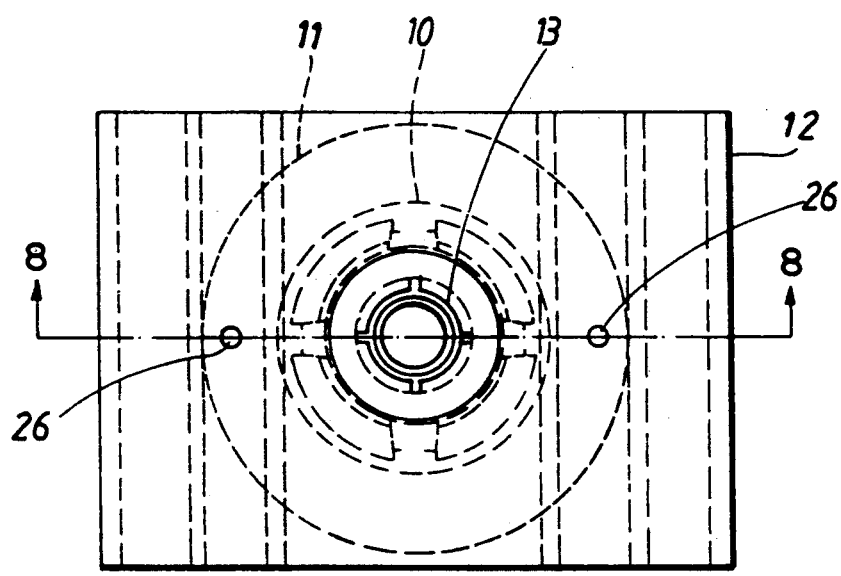
FIG. 7 is an end view of a fixation element according to a second embodiment of the invention.
Figure 8:
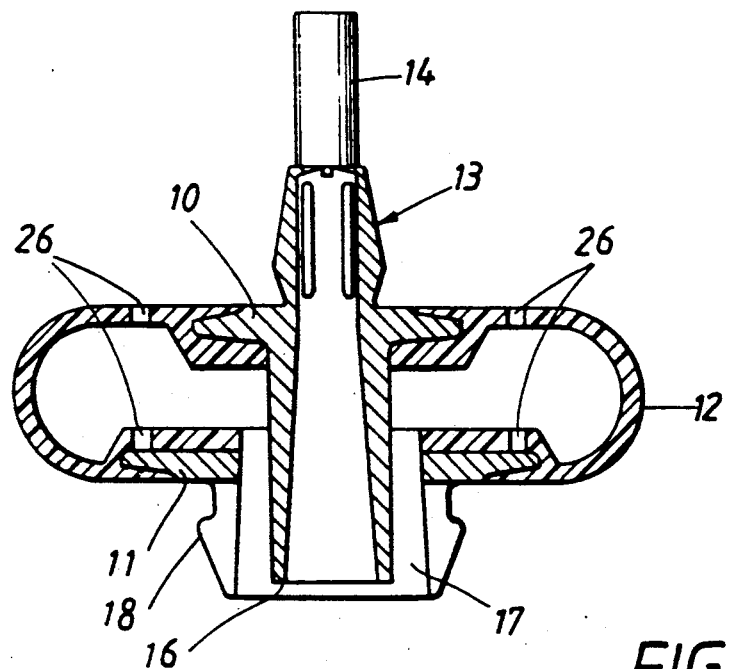
FIG. 8 is a section along the line 8—8 in FIG. 7.

In the second embodiment of the invention shown in FIGS. 7 and 8, the same work-piece 21 as described in accordance with the first embodiment is being used. However, the elastomeric part 12 has been cast in the form of a flattened oval tube, wherein the two flat sides of the oval forms the bases for the bearing plates 10, 11. The half circular parts of the oval tube add resilience to the elastomeric part 12. This design of the elastomeric part 12 makes it easy to vary the shape of the elastomeric part for different applications and it also makes it possible to use a wide spectrum of materials with different elastomeric properties. The elastomeric part 12 is provided with holes 26 for projecting pins 23a, which have been described already in conjunction with the first embodiment.

In the two exemplary embodiments shown in the drawings the elastomer material extends around both sides of the bearing plates. This makes it possible to achieve a mechanical binding between the hard plastic and the elastomer, by means of the plates being provided with a number of small openings which can constitute bridging spaces for the elastomer material. Alternatively, molecular binding can be achieved between the hard plastic and the elastomer.

The invention is not limited to the exemplary embodiment described above, and several variants are conceivable within the scope of the subsequent claims. For example, the appearance of the elastomer part can be varied in many ways, in order to provide maximum damping at different frequencies. Each bearing plate can be provided with more than one snap-in member. Consequently, within the scope of the appended claims, the present invention may be practiced otherwise that as specifically described herein.

What we claim:

1. A fixation element for facilitating assembly of a first component at an axially spaced distance with respect to a second component in a vibration-free or shock-absorbing manner, comprising:
   a first bearing plate having first bearing surface means for engaging a first surface of said first component so as to support said first component thereon, a first peripheral edge portion and first snap-in fastener means for insertion within a first through-hole defined within said first component such that said first snap-in fastener means is engageable with a second surface of said first component such that said first component is fixed upon said first bearing plate between said first bearing surface means said first snap-in fastener means;
   a second bearing plate having second bearing surface means for engaging a first surface of said second component so as to support said second component thereon, a second peripheral edge portion, and second snap-in fastener means for insertion within a second through-hole defined within said second component such that said second snap-in fastener means is engageable with a second surface of said second component such that said second component is fixed upon said second bearing plate between said second bearing surface means and said second snap-in fastener means; and
   a body of elastomeric plastic material interposed between and encasing said first and second peripheral edge portions of said first and second bearing plates for connecting said first and second bearing plates together with a predetermined axial distance defined therebetween.

2. A fixation element as set forth in claim 1, wherein:
   the diametrical extend of said first peripheral edge portion of said first bearing plate is less than the diametrical extent of said second peripheral edge portion of said second bearing plate.

3. A fixation element as set forth in claim 1, further comprising:
   locking pin means co-axially disposed with respect to said first snap-in fastener means for expanding said first snap-in fastener means radially outwardly with respect to said first through-hole defined within said first component when said locking pin means is moved from a first axial position external to said first snap-in fastener means to a second axial position disposed internally within said first snap-in fastener means.

4. A fixation element as set forth in claim 1, wherein:
   the diametrical extend of said first snap-in fastener means is less than the diametrical extent of said second snap-in fastener means such that said first snap-in fastener means can snap-fittingly engage said first through-hole of said first component which has a diametrical extent which is less than the diametrical extent of said second through-hole of said second component within which said second snap-in fastener means can be snap-fittingly engaged.

5. A fixation element as set forth in claim 1, wherein:
   said first and second bearing plates comprise polyamide.

6. A fixation element as set forth in claim 1, wherein:
   said body of elastomeric plastic material has the configuration of a flattened oval tube as seen in cross-section.

7. A fixation element as set forth in claim 1, wherein said first bearing plate further comprises:
   a sleeve portion coaxial with said first snap-in fastener means and projecting axially from a second surface of said first bearing plate which is opposite said first bearing surface means of said first bearing plate.

8. A fixation element as set forth in claim 7, wherein:
   said first snap-in fastener means projects axially from said first bearing surface means of said first bearing plate.

9. A fixation element as set forth in claim 1, wherein:
   said first and second bearing plates and said body of elastomeric plastic material together define said fixation element having a configuration which is substantially that of a trapezoid.

10. A fixation element as set forth in claim 1, wherein:
    said first component comprises a refrigerator appliance frame; and said second component comprises a refrigerant compressor.

* * * * *